(12) United States Patent
Seyama et al.

(10) Patent No.: US 7,056,965 B2
(45) Date of Patent: Jun. 6, 2006

(54) POLYOXYMETHYLENE RESIN COMPOSITION

(75) Inventors: Toshiharu Seyama, Kurashiki (JP); Mitsuhiro Horio, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/913,189

(22) PCT Filed: Dec. 26, 2000

(86) PCT No.: PCT/JP00/09249

§ 371 (c)(1),
(2), (4) Date: Aug. 13, 2001

(87) PCT Pub. No.: WO01/48084

PCT Pub. Date: Jul. 5, 2001

(65) Prior Publication Data

US 2002/0183430 A1    Dec. 5, 2002

(30) Foreign Application Priority Data

Dec. 27, 1999 (JP) .................................. 11-369043

(51) Int. Cl.
   C08K 5/10    (2006.01)
   C08K 5/20    (2006.01)
   C08K 5/101   (2006.01)
   C03C 25/26   (2006.01)
   C09D 11/10   (2006.01)
   C08G 28/46   (2006.01)
   C08L 61/00   (2006.01)
   C09B 67/00   (2006.01)
   C09D 5/44    (2006.01)

(52) U.S. Cl. ..................... 524/227; 524/228; 524/318; 524/377; 524/500; 524/502; 524/512

(58) Field of Classification Search ................ 524/377, 524/227, 228, 318, 500, 502, 512
See application file for complete search history.

(56) References Cited

U.S. PATENT DOCUMENTS

| | | | | |
|---|---|---|---|---|
| 4,351,916 A | * | 9/1982 | Kohan | 524/377 |
| 4,547,539 A | * | 10/1985 | Spivack et al. | 524/112 |
| 4,666,963 A | * | 5/1987 | Ravichandran et al. | 524/101 |
| 5,212,222 A | * | 5/1993 | Mitsuuchi et al. | 524/230 |
| 5,519,075 A | * | 5/1996 | Matsumoto et al. | 524/100 |
| 6,077,908 A | | 6/2000 | Yahiro | |

FOREIGN PATENT DOCUMENTS

| | | |
|---|---|---|
| DE | 19681563 | 10/1998 |
| EP | 0658599 | 6/1995 |
| JP | 8311302 | 11/1996 |

* cited by examiner

Primary Examiner—Nathan M. Nutter
(74) Attorney, Agent, or Firm—Birch, Stewart, Kolasch & Birch, LLP

(57) ABSTRACT

A polyoxymethylene resin composition, which comprises (A) 100 parts by weight of polyoxymethylene resin, (B) 0.01 to 5 parts by weight of at least one polymer selected from homopolymers of N-vinylcarboxylic acid amides and copolymers of N-vinylcarboxylic acid amides and other vinyl monomers, and (C) 0.01 to 5 parts by weight of at least one compound selected from the group consisting of polyalkylene glycol and its derivatives, fatty acid amides, esters of alcohols and fatty acids, and esters of alcohols and dicarboxylic acids. Such a polyoxymethylene resin composition has a small amount of released formaldehyde gas during production and molding and suppressed scorching generation and is also distinguished in the water resistance and repeated impact resistance of the resulting moldings.

9 Claims, No Drawings

POLYOXYMETHYLENE RESIN COMPOSITION

This application is the national phase under 35 U.S.C. § 371 of PCT International Application No. PCT/JP00/09249 which has an International filing date of Dec. 26, 2000, which designated the United States of America and was not published in English.

TECHNICAL FIELD

The present invention relates to a polyoxymethylene resin composition, and more particularly to a polyoxymethylene resin composition capable of releasing less formaldehyde gas during production and molding and also having distinguished water resistance and repeated impact resistance when molded.

BACKGROUND ART

Heretofore, polyoxymethylene resin composition have been widely used in various mechanical working components and OA appliances as an engineering resin having balanced mechanical properties and wear resistance. In the production of polyoxymethylene resin, formaldehyde is usually used as a monomer, but due to wear in the molding machines, for example, in the extruder barrels, as a result of their use over a long period of time, thereby making the resin stagnant at some positions therein or due to some improper setting of temperature in the granulation or molding step or being left standing in a heated state for a long time, formaldehyde monomers will be sometimes released from the resin as a formaldehyde gas, resulting in a strong possibility of deteriorating the working circumstances in the production and molding of polyoxymethylene resin.

As a method of reducing the amount of released formaldehyde, JP-B-34-5440 discloses a method of adding a polyamide copolymer thereto; JP-B-39-21118 discloses a method of adding polysulfonamide thereto; JP-B-42-17107 disclose a method of adding a copolymer of acrylamide and styrene or vinylnaphthalene thereto; JP-B-43-14329 discloses a method of adding a copolymer with an acrylamide thereto; JP-B-43-22670 discloses a method of adding a superpolyamide thereto; JP-B-45-1752 discloses a method of adding polyamidothiophenol thereto; JP-A-51-64558 discloses a method of adding a polyamide copolymer having a melting point of not more than 180° C. thereto; JP-A-54-13551 discloses a method of adding a polyamide and a fatty acid thereto; JP-B-55-24465 discloses a method of adding an alkylurethane and a carboxylic acid amide thereto; JP-A-59-213752 and U.S. Pat. No. 5,015,707 disclose a method of adding a poly-β-alanine copolymer thereto; JP-B-2-11625 discloses a method of adding polytetramethylene adipamide particles pulverized to particle sizes of not more than 10 μm thereto; U.S. Pat. No. 5,106,888 discloses a method of adding a non-meltable polymer having aldehyde reacting groups thereto; etc. However, even addition of any of these materials to the polyoxymethylene resin has not been fully successful for preventing the release of formaldehyde gas from the resin.

On the other hand, JP-A-8-311302 discloses a method of adding at least one polymer selected from the group consisting of N-vinylcarboxylic acid amide homopolymers and copolymers of N-vinylcarboxylic acid amide and other vinyl monomers to the polyoxymethylene resin. Such a polymer can indeed more effectively absorb the formaldehyde gas than the aforementioned materials, but still suffers from such problems that discolored materials, which seem to be formed by heating, etc. of polymer per se in the extruder, molding machine, etc., (such material will be hereinafter referred to as "scorching") are formed in the resulting composition or moldings, considerably deteriorating the appearance and resulting in inferior products. Furthermore, such a polymer has a high water absorbability per se, and thus there is a strong possibility that portions of the moldings may undergo swelling in contact with water during use in water or in high-humidity outdoor circumstances, or the like or there is a strong possibility of changes in mechanical and physical properties. Still furthermore, the recent trend of using moldings made from polyoxymethylene resin compositions is shifting toward thinner, more size-reduced mechanical working components, etc. and thus further improvement in physical properties against repeated stresses has been so far keenly desired.

In the production and molding of polyoxymethylene resin compositions there have been so far no technologies available for reducing the amount of released formaldehyde gas, suppressing "scorching" generation and improving the water resistance and repeated impact resistance of the resulting moldings.

The present invention has been accomplished to overcome the aforementioned problems and an object of the present invention is to provide a polyoxymethylene resin composition capable of reducing the amount of released formaldehyde gas and suppressing "scorching" generation during the production and molding of polyoxymethylene resin compositions and also improving the water resistance and repeated impact resistance of the resulting moldings.

DISCLOSURE OF THE INVENTION

As a result of extensive studies to attain the aforementioned object of the present invention, the present inventors have found that reduction in the amount of released formaldehyde gas and suppression of "scorching" generation can be attained at the same time by using a polyoxymethylene resin composition comprising polyoxymethylene resin, at least one polymer selected from the group consisting of homopolymers of N-vinylcarboxylic acid amides and copolymers of N-vinylcarboxylic acid amides and other vinyl monomers, and at least one compound selected from the group consisting of polyalkylene glycol and its derivatives, fatty acid amides, esters of alcohols and fatty acids, and esters of alcohols and dicarboxylic acids, and further that the moldings obtained from such a polyoxymethylene resin composition are distinguished not only in the water resistance, but also in the repeated impact resistance, and have accomplished the present invention.

That is, the present invention provides a polyoxymethylene resin composition, which comprises (A) 100 parts by weight of a polyoxymethylene resin, (B) 0.01 to 5 parts by weight of at least one polymer selected from the group consisting of homopolymers of N-vinylcarboxylic acid amides and copolymers of N-vinylcarboxylic acid amides and other vinyl monomers, and (C) 0.01 to 5 parts by weight of at least one compound selected from the group consisting of polyalkylene glycol and its derivatives, fatty acid amides, esters of alcohols and fatty acids, and esters of alcohols and dicarboxylic acids.

BEST MODES FOR CARRYING OUT THE INVENTION

A polyoxymethylene resin as Component (A) of the present invention includes, for example, polyoxymethylene homopolymer resins obtained by polymerizing monomers of formaldehyde or its cyclic oligomers such as trimer (trioxane), tetramer (tetraoxane), etc., and stabilizing the resulting polymers through etherification, esterification, urethanization, etc. of both terminals thereof, polyoxymethylene copolymer resins containing 0.01 to 20% by weight of oxyalkylene units having 2 to 8 carbon atoms, obtained by copolymerizing trioxane, tetraoxane, etc. with ethylene oxide, propylene oxide, and cyclic ethers such as 1,3-dioxolane, diol formal, diglycol formal, etc., those having branched molecular chains, and polyoxymethylene block copolymer resins, one end of which is terminated with an alkylene oxide adduct residue to alcohol and/or carboxylic acid. These polyoxymethylene resins can be used alone or in mixture of at least two thereof.

Above all, it is preferable from the viewpoints of a distinguished effect on the reduction in the amount of released formaldehyde gas and a distinguished repeated impact resistance of the resulting molding to use polyoxymethylene homopolymer resins and polyoxymethylene block copolymer resins, one end of which is terminated by an alkylene oxide adduct residue to the alcohol and/or carboxylic acid as Component (A).

More preferable are polyoxymethylene homopolymer resins, at least one end of which is terminated by an acetyl group, and polyoxymethylene block copolymer resins comprising not less than 50% by weight of a segment consisting of oxymethylene units and not more than 50% by weight of a segment consisting of an alkylene oxide adduct residue component to the alcohol and/or carboxylic acid, one end of which is terminated with an alkylene oxide adduct residue to alcohol and/or carboxylic acid.

Polyoxymethylene block copolymer resins, one end of which is terminated with an alkylene oxide adduct residue to the alcohol and/or carboxylic acid can be produced by a process disclosed, for example, in JP-B-2-24307. Specifically, block copolymers, one end of which is terminated by an alkylene oxide adduct residue to the alcohol and/or carboxylic acid, can be obtained by reaction of an alkylene oxide adduct to the alcohol and/or carboxylic acid with formaldehyde. The other end of the block copolymer is a hydroxyl group, and thus the block copolymer can be used after further stabilization through well known etherification, esterification, urethanization, etc.

Component (B) for use in the present invention includes, for example, homopolymers of N-vinylcarboxylic acid amides, and copolymers of N-vinylcarboxylic acid amides and other vinyl monomers.

N-vinylcarboxylic acid amides are compounds represented by the following general formula (1):

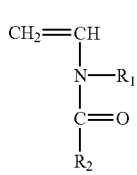
(1)

(where $R_1$ and $R_2$ are independently selected from a hydrogen atom and alkyl groups having 1 to 20 carbon atoms).

N-vinylcarboxylic acid amides can be synthesized by thermal decomposition of N-(α-alkoxyalkyl)acrylamide readily synthesized from acetaldehyde, carboxylic acid amide and alcohol or from N-alkylene carboxylic acid amide through electrolysis in the presence of an alcohol, or by thermal decomposition of ethylidene bisacetamide synthesized from acetaldehyde and acetamide, or by dehalogenation reaction of N-(β-halogenoalkyl)-carboxylic acid amide.

Specifically, they include, for example, N-vinylformamide, N-vinylacetamide, N-methyl-N-vinylformamide, N-methyl-N-vinylacetamide, N-vinylisobutylamide, N-vinylisopropylamide, N-vinylstearylamide, etc. Above all, it is particularly preferable from the viewpoint of the effect on reduction in the amount of released formaldehyde gas to use N-vinylacetamide.

Other vinyl monomers capable of forming copolymers with N-vinylcarboxylic acid amides are those having at least one vinyl group in the molecule.

Specifically, monofunctional unsaturated monomers for them include, for example, aliphatic vinyl monomers such as propylene, butane-1,4-methylpentene-1, etc.; acrylonitrile; styrene; vinylcarboxylates such as vinyl acetate, etc.; vinyl ketones such as methyl vinyl ketone, etc.; vinyl ethers such as methyl vinyl ether, etc.; acrylic acid and methacrylic acid [both of which will be hereinafter generically referred to as "(meth)acrylic acid"] or their alkali metal salts such as sodium salt, potassium salt, etc.; alkyl esters of (meth) acrylic acid such as methyl ester, ethyl ester, palmityl ester, stearyl ester, etc.; hydroxyalkyl esters of (meth)acrylic acid such as hydroxyethyl ester, etc.; alkylamino group-substituted alkyl esters of (meth)acrylic acid such as dimethylaminomethyl ester, etc.; quaternary ammonium group-substituted alkyl esters of (meth)acrylic acid such as trimethylammonioethyl ester halide, etc.; (meth)acrylic acid amides; alkylamino group-substituted amides of (meth) acrylic acid such as dimethylaminomethylamide, etc.; quaternary ammonium-substituted alkylamide of (meth)acrylic acid such as trimethylammonioethylamide halide, etc.; sulfonate- or alkali metal sulfonate-substituted alkylamides of (meth)acrylic acid such as sulfomethylamide, potassiumsulfomethylamide, etc.; or the like.

Multifunctional unsaturated monomers include, for example, alkylenebisacrylamides such as N,N'-methylenebisacrylamide, N,N'-ethylenebisacrylamide, etc.; N,N'-alkylenebis(N-vinylcarboxylic acid amide) such as N,N'-methylenebis (N-vinylacetamide), N,N'-butylenebis(N-vinylacetamide), N,N'-ethylenebis(N-vinylformamide), N,N'-butylenebis(N-vinylformamide), etc.; butadiene; isoprene; 1,4-hexadiene; divinylbenzene; ethyleneglycol di(meth)acrylate ester, butanediol di(meth)acrylate ester; etc.

To obtain a better effect on the reduction in the amount of released formaldehyde gas, it is preferable to conduct fine pulverization of homopolymers of N-vinylcarboxylic acid amides or copolymers of N-vinylcarboxylic acid amides and other vinyl monomers as Component (B). It is preferable from the viewpoint of pulverizability to use cross-linkable multifunctional unsaturated monomers as other vinyl monomers for forming copolymers of N-vinylcarboxylic acid amides. More preferable are alkylenebisacrylamides such as N,N'-methylenebisacrylamide, etc. and N,N'-alkylenebis(N-vinylcarboxylic acid amide) such as N,N'-butylenebis(N-vinylacetamide), etc.

The content of other vinyl monomers for forming copolymers of N-vinylcarboxylic acid amides is in a range of $2 \times 10^{-4}$ to 50 mol. % on the basis of total copolymer components, and particularly when multifunctional unsaturated monomers capable of acting as a cross-linking agent are used, the content thereof is in a range of $2.5 \times 10^{-4}$ to 30 mol. % on the basis of total copolymer components.

The amount of at least one polymer selected from the group consisting of homopolymers of N-vinylcarboxylic acid amides and copolymers of N-vinylcarboxylic acid amides and other vinyl monomers as Component (B) is 0.01 to 5 parts by weight on the basis of 100 parts by weight of polyoxymethylene resin as Component (A). Below 0.01 part by weight or above 5 parts by weight the effect of the present invention would be difficult to obtain. Preferable is 0.05 to 3 parts by weight, and more preferable is 0.1 to 1 part by weight.

The process for polymerization of homopolymers of N-vinylcarboxylic acid amides or polymerization of copolymers of N-vinylcarboxylic acid amides and other vinyl monomers is not particularly limited, and it is possible to use processes disclosed, for example, in JP-A-59-086614, U.S. Pat. Nos. 5,455,042, 5,407,996 and 5,338,815. Usually, an aqueous solution polymerization process, a reversed phase suspension polymerization process, a reversed phase emulsion polymerization process, etc. can be used.

The aqueous solution polymerization process comprises uniformly dissolving monomer components in such a solvent as water, a hydrophilic organic solvent, which is uniformly miscible with water, or a mixed solvent thereof, removing dissolved oxygen from the system by vacuum degassing or flushing with an inert gas such as nitrogen, etc., and then adding a polymerization initiator thereto to start the reaction. The polymerization-initiating temperature is usually about $-10°$ C. to about $90°$ C., and the polymerization time is about 1 to about 10 hours. Hydrophilic organic solvents include, for example, alcohols such as methyl alcohol, etc.; cyclic ethers such as tetrahydrofuran, etc.; fatty acid esters such as ethyl acetate, etc.; acetone; acetonitrile; dimethylformamide; dimethylacetamide; dimethylsulfoxide, etc. Polymerization initiators include, for example, peroxides such as t-butyl peroxide, etc.; azobis compounds such as phenylazotriphenylmethane, etc.; or the like.

Reversed phase suspension polymerization process or reversed phase emulsion polymerization process comprises uniformly dissolving monomer components in water and suspending or emulsifying the resulting solution in an organic solvent, which is uniformly immiscible with water, to start the polymerization reaction. Organic solvents, which are uniformly immiscible with water, include, for example, hydrocarbons such as hexane, cyclohexane, benzene, etc.; halogenated hydrocarbons such as dichloromethane, etc., or the like.

In the reversed phase emulsion polymerization process, a surfactant is used as a dispersing agent, and a protective colloid is also used at the same time, if required. Typically, they include sorbitan monostearate, polyvinyl alcohol, ethyl cellulose, etc.

It is preferable from the viewpoints of improvement in the water resistance and repeated impact resistance of polyoxymethylene resin compositions that the homopolymers of N-vinylcarboxylic acid amides or copolymers of N-vinylcarboxylic acid amides and other vinyl monomers have an average degree of polymerization of 1,000 to 500,000.

Reaction products resulting from the polymerization reaction are in a gel state containing the solvent used in the reaction, and are usually disintegrated by a rotary cutter, etc., and used as powders after removal of the solvent therefrom by heating, pressure reduction or other procedures, drying and powder classification. The average particle size of the powders is not particularly limited, but from the viewpoints of reduction in the amount of released formaldehyde gas, water resistance and repeated impact resistance, not more than 20 μm is preferable. More preferable is not more than 10 μm.

Description will be made below of polyalkylene glycol and its derivatives, fatty acid amides, esters of alcohols and fatty acids and esters of alcohols and dicarboxylic acids to be used as Component (C) in the present invention.

Polyalkylene glycol and its derivatives to be used as Component (C) in the present invention are those represented by the following general formula (2):

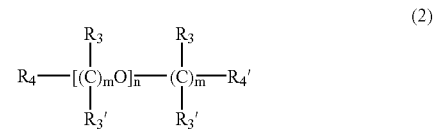

(where $R_3$ and $R_3'$ are independently selected from the group consisting of hydrogen atom, an alkyl group, a substituted alkyl group, an aryl group and a substituted aryl group, $R_4$ and $R_4'$ are independently selected from the group consisting of a hydroxyl group, an alkyl ether group, a substituted alkyl ether group, an aryl ether group, a substituted aryl ether group, an alkyl ester group, a substituted alkyl ester group, an aryl ester group and a substituted aryl ester group, m is an integer of 1 to 6 and n is an integer of 1 to 1,000).

These compounds can be obtained by polymerization processes including polycondensation of glycols, polycondensation of glycols and α,ω-dihalogenated compounds, polycondensation of glycols and acetals, addition polymerization of aldehydes, ring-opening polymerization of cyclic ethers, ring-opening polymerization of cyclic acetals, etc.

For example, in the ring-opening polymerization of cyclic ethers or cyclic acetals, they can be obtained by ring-opening polymerization of cyclic ether compounds or cyclic acetal compounds such as ethylene oxide, propylene oxide, butylene oxide, epichlorohydrin, styrene oxide, oxetane, 3,3-bis(chloromethyl)oxetane, tetrahydrofuran, 2-methylhydrofuran, oxepane, 1,3-dioxolane, 1,4-butanediol formal, 1,5-pentanediol formal, etc. or those, parts of which are substituted by halogen compounds such as chlorine, fluorine, etc., or the like, in the presence of a Friedel-Crafts type catalyst or an acid or alkali catalyst.

These cyclic ether compounds can be used alone or in combination of at least two thereof. Or, for example, ethylene oxide can be added to water, followed by addition of propylene oxide and further addition of ethylene oxide, or simultaneous addition of ethylene oxide and propylene oxide can be made.

The polyalkylene glycol derivatives include, for example, polyalkylene glycol esters obtained by acid-catalytic esterification, etc. with a fatty acid or polyalkylene glycol ethers obtained by polymerization of alkylene oxides by adding an alkali catalyst to alcohols or phenols.

Polyalkylene glycol and its derivatives include, for example, polyethylene glycol, polypropylene glycol, polybutylene glycol, poly-1,2-butylene glycol, poly-1,4-butylene glycol, poly-1,3-dioxolane, polystyrene glycol, ethylene glycol-propylene glycol copolymer, polyethylene glycol monomethyl ether, polyethylene glycol dimethyl ether, polyethylene glycol monoethyl ether, polyethylene glycol diethyl ether, polyethylene glycol monostearyl ether, polyethylene glycol distearyl ether, polyethylene glycol (monomethyl-monoethyl)ether, polyethylene glycol (monopalmityl-monostearyl)ether, polyethylene glycol (monopalmityl-monoheptadecyl)ether, polyethylene glycol monoacetate ester, polyethylene glycol diacetate ester, polyethylene glycol monostearate ester, polyethylene glycol distearate ester, polyethylene glycol (monostearate-monopalmitate) ester, monomethoxypolyethylene glycol stearate ester, etc.

Above all, polyethylene glycol, polypropylene glycol, ethylene glycol-propylene glycol copolymer, polyethylene glycol monopalmityl ether, polyethylene glycol dipalmityl ether, polyethylene glycol monostearyl ether, polyethylene glycol distearyl ether, polyethylene glycol (monopalmityl-monostearyl)ether, polyethylene glycol monopalmitate ester, polyethylene glycol dipalmitate ester, polyethylene glycol monostearate ester, polyethylene glycol distearate ester and polyethylene glycol (monopalmitate-monostearate) ester are preferable from the viewpoints of water resistance and repeated impact resistance. Polyethylene glycol and its derivatives, polypropylene glycol and its derivatives and ethylene glycol-propylene glycol copolymer and its derivatives, which have a number average molecular weight of not less than 1,000, are more preferable from their easy availability.

More preferable are polyethylene glycol and its derivatives, polypropylene glycol and its derivatives and ethylene glycol-propylene glycol copolymer and its derivatives, which have a number average molecular weight lower limit of 4,000, allowing them to maintain a powdery state at 40° C. as selected from the viewpoint of working efficiency on one hand, and a number average molecular weight upper limit of 8,000, as selected from such a viewpoint that the thermal decomposition resistance of polyalkylene glycol and its derivatives per se will become poorer with increasing molecular weight. Polyalkylene glycol and its derivatives can be used alone or in combination of at least two thereof.

The amount of polyalkylene glycol and its derivatives is 0.01 to 5 parts by weight on the basis of 100 parts by weight of polyoxymethylene resin. Below 0.01 part by weight, the effect of the present invention would be difficult to attain, whereas above 5 parts by weight lowering of moldability or lowering of water resistance will likely take place because most of the polyalkylene glycols and its derivatives per se are water-soluble. Preferable is 0.03 to 3 parts by weight. More preferable is 0.05 to 1 part by weight.

Description will be made below of fatty acid amides. Fatty acid amides are those represented by the following general formula (3):

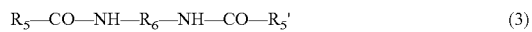

$$R_5-CO-NH-R_6-NH-CO-R_5' \quad (3)$$

(where $R_5$ and $R_5'$ are independently selected from an alkyl group and a substituted alkyl group, and $R_6$ is an alkylene group).

Fatty acids for use as starting materials for fatty acid amides can be any of saturated fatty acids, unsaturated fatty acids and hydroxyl group-substituted ones, but it is preferable to use saturated fatty acids. Fatty acids for use in the present invention include, for example, capric acid, lauric acid, tridecylic acid, myristic acid, pentadecylic. acid, palmitic acid, heptadecylic acid, stearic acid, nonadecanoic acid, arachic acid, behenic acid, lignoceric acid, cerotic acid, montanic acid, melissic acid, ceroplastic acid, undecylenic acid, oleic acid, elaidic acid, cetoleic acid, erucic acid, brassidic acid, sorbic acid, linoleic acid, linolenic acid, arachidonic acid, propiolic acid, stearolic acid, 12-hydroxy-dodecanoic acid, 3-hydroxydecanoic acid, 16-hydroxyhexadecanoic acid, 10-hydroxyhexadecanoic acid, 12-hydroxyoctadecanoic acid, 10-hydroxy-8-octadecanoic acid, dl-erythro-9,10-hydroxyoctadecanoic acid, etc.

Diamines as a counterpart starting material include, for example, ethylenediamine, trimethylenediamine, tetramethylenediamine, hexamethylenediamine, heptamethylenediamine, octamethylenediamine, nonamethylenediamine, decamethylenediamine, etc.

A process for producing fatty acid amides from these starting materials is not particularly limited, and they can be obtained by well known amidation condensation reactions, etc.

As fatty acid amides it is preferable from the viewpoints of water resistance and repeated impact resistance to use fatty acid amides obtained from fatty acids having 10 to 30 carbon atoms and diamine. More preferable fatty acid amides are a mixture of saturated fatty acid amides obtained from at least two fatty acids having 12 to 22 carbon atoms and at least one diamine (preferably aliphatic one having 2 to 6 carbon atoms). The saturated fatty acid amide obtained from at least two saturated fatty acids and at least one diamine is, for example, in the case of using palmitic acid and stearic acid, and ethylenediamine as starting materials, a mixture of ethylene bispalmitamide and ethylene bisstearamide, further containing saturated fatty acid amides of different fatty acids such as ethylene (monopalmitic acid-monostearic acid) amide. Particularly preferable are mixtures of saturated fatty acid amides obtained from a diamine, at least one saturated fatty acid having an even number of carbon atoms and at least one saturated fatty acid having an odd number of carbon atoms.

They include, for example, ethylene biscapramide, ethylene bisundecylamide, ethylene bislauramide, ethylene bistridecylamide, ethylene bismyristamide, ethylene bispentadecylamide, ethylene bispalmitamide, ethylene bisheptadecylamide, ethylene bisstearamide, ethylene bisbehenamide, ethylene bismelissamide, ethylene bisoleinamide, ethylene biserucamide, ethylene bislinolamide, ethylene bisstearolamide, dimethylene bisstearamide, trimethylene bisstearamide, tetramethylene bisstearamide, pentamethylene bisstearamide, hexamethylene bisstearamide, etc. They can be used alone or in combination of at least two thereof.

The amount of fatty acid amide to be added is 0.01 to 5 parts by weight on the basis of 100 parts by weight of polyoxymethylene resin. Below 0.01 part by weight the effect of the present invention would be difficult to obtain, whereas above 5 parts by weight there is the possibility that the moldings will turn brown or the moldability will be deteriorated. Preferable is 0.03 to 3 parts by weight. More preferable is 0.05 to 1 part by weight.

Description will be further made below of esters of alcohols and fatty acids and esters of alcohols and dicarboxylic acids.

At first, description will be made of fatty acids and dicarboxylic acids for use as starting materials.

As fatty acids for use as starting materials, any of the saturated fatty acids, unsaturated fatty acids and hydroxyl group-substituted ones can be used, but it is preferable to use saturated fatty acids. Fatty acids for use in the present invention include, for example, capric acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, ceroplastic acid, undecylenoic acid, oleic acid, elaidic acid, cetoleic acid, erucic acid, brassidic acid, sorbic acid, linoleic acid, linolenic acid, arachidonic acid, propiolic acid, stearolic acid, 12-hydroxydodecanoic acid, 3-hydroxydecanoic acid, 16-hydroxyhexadecanoic acid, 10-hydroxyhexadecanoic acid, 12-hydroxyoctadecanoic acid, 10-hydroxy-8-octadecanoic acid, dl-erythro-9,10-hydroxyoctadecanoic acid, etc.

On the other hand, dicarboxylic acids include, for example, oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, etc.

Description will be made below of alcohols for use as starting materials.

Alcohols as referred to in the present invention mean monohydric alcohols having one hydroxyl group and polyhydric alcohols having 2 to 6 hydroxyl groups, including glycols.

Monohydric alcohols include, for example, methyl alcohol, ethyl alcohol, propyl alcohol, butyl alcohol, isobutyl alcohol, sec-butyl alcohol, tert-butyl alcohol, amylalcohol, hexyl alcohol, heptyl alcohol, octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, eicosyl alcohol, ceryl alcohol, melissyl alcohol, allyl alcohol, crotyl alcohol, propargyl alcohol, cyclopentanol, cyclohexanol, benzyl alcohol, cinnamyl alcohol, furfuryl alcohol, etc.

Polyhydric alcohols having 2 to 6 hydroxyl groups include, for example, ethylene glycol, propylene glycol, butylene glycol, dioxyacetone, dioxyanthracene, dioxyxylene, dioxytoluene, dioxyquinoline, dioxyphenyl ether, dioxystilbene, catechol, hydroquinone, 1,4-dihydroxynaphthalene, dioxyphenanthrene, dioxybenzophenone, 1,4-dihydroxyanthraquinone, diphenylol propane, phloroglucinol, glycerin, hexanetriol, pentaerythritol, arabitol, ribitol, xylitol, sorbitol, mannitol, etc.

A process for producing esters of alcohols and fatty acids or esters of alcohols and dicarboxylic acids from these starting materials is not particularly limited, and the esters can be obtained by well known ester condensation reactions, etc.

As esters of monohydric alcohols and fatty acids, it is preferable from the viewpoints of water resistance and repeated impact resistance to use fatty acid esters obtained from fatty acids having 10 to 30 carbon atoms and monohydric alcohols having 10 to 30 carbon atoms. More preferable are mixtures of saturated fatty acid esters obtained from at least two saturated fatty acids having 12 to 22 carbon atoms and at least one monohydric alcohol (preferably saturated aliphatic ones having 12 to 22 carbon atoms).

They include, for example, methyl caprate ester, methyl undecylate ester, methyl laurate ester, methyl tridecylate ester, methyl myristate ester, methyl pentadecylate ester, methyl palmitate ester, methyl heptadecylate ester, methyl stearate ester, methyl nonadecanate ester, methyl arachate ester, ethyl behenate ester, methyl lignocerate ester, methyl cerotate ester, methyl heptacosanate ester, methyl montanate ester, methyl melissate ester, methyl lacerate ester, methyl oleate ester, methyl elaidate ester, methyl cetolate ester, methyl erucate ester, methyl brassidate ester, methyl linolate ester, methyl linolenate ester, methyl stearolate ester, ethyl stearate ester, propyl stearate ester, butyl stearate ester, tert-butyl stearate ester, amyl stearate ester, hexyl stearate ester, heptyl stearate ester, octyl stearate ester, nonyl stearate ester, decyl stearate ester, undecyl stearate ester, lauryl stearate ester, tridecyl stearate ester, myristyl stearate ester, pentadecyl stearate ester, cetyl stearate ester, heptadecyl stearate ester, stearyl stearate ester, nonadecyl stearate ester, eicosyl stearate ester, ceryl stearate ester, melissyl stearate ester, allyl stearate ester, propargyl stearate ester, cyclopentyl stearate ester, cyclohexyl stearate ester, cyclohexyl stearate ester, benzyl stearate ester, cinnamyl stearate ester, furfuryl stearate ester, etc.

As esters of polyhydric alcohols and fatty acids, fatty acid esters obtained from fatty acids having 10 to 30 carbon atoms and polyhydric alcohols are preferable from the viewpoints of water resistance and repeated impact resistance. More preferable are mixtures of saturated fatty acid esters obtained from at least two saturated fatty acids having 12 to 22 carbon atoms and at least one polyhydric alcohol having 2 to 6 hydroxyl groups. These mixtures can be used together with the aforementioned mixtures of saturated fatty acid esters obtained from at least two saturated fatty acids having 12 to 22 carbon atoms and at least one monohydric alcohol (preferably saturated aliphatic ones having 12 to 22 carbon atoms). The saturated fatty acid esters obtained from at least two saturated fatty acids and at least one polyhydric alcohol are, for example, in the case of using palmitic acid, stearic acid and ethylene glycol as starting materials, mxitures of ethylene glycol monopalmitate ester, ethylene glycol monostearate ester, ethylene glycol dipalmitate ester and ethylene glycol distearate ester, further containing saturated fatty acid esters of different fatty acids such as ethyleneglycol (monopalmitate-monostearate) ester. Particularly preferable are saturated fatty acid esters obtained from a polyhydric alcohol having 2 to 6 hydroxyl groups, at least one saturated fatty acid having an even number of carbon atoms and at least one saturated fatty acid having an odd number of carbon atoms.

They include, for example, ethylene glycol monolaurate ester, ethylene glycol dilaurate ester, ethylene glycol monotridecylate ester, ethylene glycol ditridecylate ester, ethylene glycol monomyristate ester, ethylene glycol dimyristate ester, ethylene glycol monopentadecylate ester, ethylene glycol dipentadecylate ester, ethylene glycol monopalmitate ester, ethylene glycol dipalmitate ester, ethylene glycol diheptadecylate ester, ethylene glycol monostearate ester, ethylene glycol distearate ester, propylene glycol distearate ester, hexamethylene glycol distearate ester, glycerin monostearate ester, glycerin distearate ester, glycerin tristearate ester, pentaerythritol monostearate ester, pentaerythritol distearate ester, pentaerythritol tristearate ester, pentaerythritol tetrastearate ester, etc.

As esters of alcohols and dicarboxylic acids, it is preferable from the viewpoints of water resistance and repeated impact resistance to use dicarboxylic acid esters obtained from monohydric alcohols having 10 to 30 carbon atoms and dicarboxylic acids. More preferable are mixtures of dicarboxylic acid esters obtained from at least two saturated aliphatic monohydric alcohols having 12 to 22 carbon atoms and at least one dicarboxylic acid. The dicarboxylic acid esters obtained from at least two saturated aliphatic monohydric alcohols and at least one dicarboxylic acid are, for example, in the case of using palmityl alcohol, stearyl alcohol and adipic acid as starting materials, mixtures of monopalmityl adipate ester, monostearyl adipate ester, dipalmityl adipate ester and distearyl adipate ester, further containing dicarboxylic acid esters of different saturated aliphatic monohydric alcohols such as (monopalmityl-monostearyl)adipate ester. Particularly preferable are dicarboxylic acid esters obtained from dicarboxylic acids, at least one saturated aliphatic monohydric alcohol having an even number of carbon atoms and at least one saturated aliphatic monohydric alcohol having an odd number of carbon atoms.

They include, for example, dimethyl oxalate ester, dimethyl malonate ester, dimethyl succinate ester, dimethyl glutarate ester, dimethyl adipate ester, dimethyl pimelate ester, dimethyl suberate ester, dimethyl azelate ester, dimethyl sebacate ester, dimethyl maleate ester, dimethyl fumarate ester, dimethyl phthalate ester, dimethyl isophthalate ester, dimethyl terephthalate ester, diethyl adipate ester, dipropyl adipate ester, dibutyl adipate ester, dipentyl adipate ester, dihexyl adipate ester, dicapryl adipate ester, dilauryl adipate ester, ditridecyl adipate ester, dicetyl adipate ester, dipentadecyl adipate ester, dipalmityl adipate ester, diheptadecyl adipate ester, distearyl adipate ester, dinonadecyl adipate ester, diceryl adipate ester, dimelissyl adipate ester, di(ethylene glycol) adipate ester, di(propylene glycol) adipate ester, (monoethylene glycol-monopropylene glycol) adipate ester, di(polyethylene glycol) adipate ester, (monopolyethylene glycol-monopolypropylene glycol) adipate ester, di(ethylene glycol-monopropylene glycol copolymer) adipate, etc.

The amount of esters of alcohols and fatty acids and esters of alcohols and dicarboxylic acids is 0.01 to 5 parts by weight on the basis of 100 parts by weight of polyoxymethylene resin. Below 0.01 part by weight the effect of the present invention would be difficult to obtain, whereas above 5 parts by weight there is such a possibility that the moldability will be deteriorated. Preferable is 0.03 to 3 parts by weight. More preferable is 0.05 to 1 part by weight.

Polyalkylene glycol and its derivatives, fatty acid amides, esters of alcohols and fatty acids and esters of alcohols and dicarboxylic acids as Component (C) of the present invention can be used alone or in combination thereof. From the viewpoint of further improvement of effect on reduction in the amount of released formaldehyde gas, polyalkylene glycol and its derivatives, and fatty acid amides are preferable. More preferable are polyalkylene glycol and its derivatives. From the viewpoints of improvement of water resistance and repeated impact resistance the ratio of Component (B) to Component (C) is preferably 0.2 to 4 (=(B)/(C)).

The mechanism of suppressing "scorching" generation by addition of Component (C) of the present invention is not clear, and desirably is not restricted even by any theories, but can be presumed, for example, as follows:

If the "scorching" generation is due to heated discoloration of Component (B) stagnating within the extruder, etc., causes for the suppression mechanism seem to be due to such fact, that addition of Component (C) would give rise to an action of suppressing the adhesiveness to metals of the homopolymers of N-vinylcarboxylic acid amides or copolymers of N-vinylcarboxylic acid amides and other vinyl monomers per se as Component (B), or an action of improving the compatibility with polyoxymethylene resin, thereby preventing Component (B) from deposition onto screw surfaces, etc. On the other hand, if the "scorching" generation is due to chemical reactions such as saccharification, etc. of Component (B), causes for the suppression mechanism seem to be due to such facts that addition of Component (C) would retard the chemical reactions or eliminate occurrence of chemical reactions per se.

The fact that addition of Component (C) can suppress the "scorching" generation and improve the water resistance and repeated impact resistance at the same time seem to be due to an improvement of compatibility of polyoxymethylene resin as Component (A) with a copolymer selected from the group consisting of homopolymers of N-vinylcarboxylic acid amides and copolymers of N-vinylcarboxylic acid amides and other vinyl monomers as Component (B), and also due to suppression of cohesion of Component (B) per se.

Effect on improvement of water resistance is pronounced particularly when the polyalkylene glycol and its derivatives are at least one member selected from polyethylene glycol and its derivatives, polypropylene glycol and its derivatives, and ethylene glycol-propylene glycol copolymer and its derivatives and have a number average molecular weight of 4,000 to 8,000; when the fatty acids are mixtures of saturated fatty acid amides obtained from at least two saturated fatty acids having 12 to 22 carbon atoms and at least one diamine; when esters of alcohols and fatty acids are at least one member selected from the group consisting of mixtures of saturated fatty acid esters obtained from at least two saturated fatty acids having 12 to 22 carbon atoms and at least one monohydric alcohol (preferably those having 12 to 22 carbon atoms) and mixtures of saturated fatty acid esters obtained from at least two saturated fatty acids having 12 to 22 carbon atoms and at least one polydric alcohol having 2 to 6 hydroxyl groups; and when esters of alcohols and dicarboxylic acids are mixtures of dicarboxylic acid esters obtained from at least two saturated aliphatic monohydric alcohols having 12 to 22 carbon atoms and at least one dicarboxylic acid.

The amount of Component (C) is 0.01 to 5 parts by weight on the basis of 100 parts by weight of polyoxymethylene resin as Component (A). Below 0.01 part by weight the effect of the present invention would be difficult to obtain, whereas above 5 parts by weight there is a possibility of lowering of the moldability and discoloration, etc. Preferable is 0.03 to 3 parts by weight. More preferable is 0.05 to 1 part by weight.

To give necessary characteristics to the present composition depending on the use and object, compounds so far used as additives to the polyoxymethylene resin can be appropriately added thereto. For example, a heat stabilizer such as polyamide, etc.; an antioxidant such as hindered phenol, etc.; an ultraviolent absorbing agent such as benzotriazole, etc.; a photostabilizer such as hindered amine, etc.; a nucleating agent such as boron nitride, etc.; a mold-releasing agent such as metal salts of fatty acids, etc.; a filler such as talc, etc.; a pigment such as titanium oxide, etc.; a lubricant such as silicone oil, etc.; polyurethane, etc. as other substances, or the like can be added thereto in such a range as not to deteriorate the object of the present invention.

The heat stabilizer includes, for example, polyamide compounds including copolymers such as nylon 4-6, nylon 6, nylon 66, nylon 6-10, nylon 11, nylon 12, nylon 6-66 copolymer, nylon 6-66-610 copolymer, etc.; acrylamide and its derivatives, copolymers of acrylamide and its derivatives with other vinyl monomers such as polyacrylamide, poly-β-alanine, polyaminoacrylamide, etc.; and amino-substituted triazine compounds such as 2,4-diamino-sym-triazine, 2,4,6-triamino-sym-triazine, 2,4-diamino-6-phenyl-sym-triazine, N-butylmelamine, N-phenylmelamine, N,N'-diphenylmelamine, N,N'-diallylmelamine, N,N',N"-triphenylmelamine, 2,4-diamino-6-methyl-sym-triazine, 2,4-diamine-6-butyl-sym-triazine, 2,4-diamino-6-benzyloxy-sym-triazine, 2,4-diamino-t-butoxy-sym-triazine, 2,4-diamino-6-cyclohexyl-sym-triazine, 2,4-diamino-6-chloro-sym-triazine, 2,4-diamino-4-mercapto-sym-triazine, 2,4-dioxy-6-amino-sym-triazine, 2-oxy-4,6-diamino-sym-triazine, N,N'-N"-tetracyanoethylbenzoguanamine, N-methylolmelamine, N,N'-dimethylolmelamine, N,N',N"- trimethylolmelamine, etc. They can be used alone or in combination of at least two thereof, or together with other additives.

The antioxidant includes, for example, n-octadecyl-3-(3', 5'di-t-butyl-4'-hydroxylphenyl)-propionate, n-octadecyl-3-(3'-methyl-5'-t-butyl-4'-hydroxyphenyl)-propionate, n-tetradecyl-3-(3',5'-di-t-butyl-4'-hydroxylphenyl)-propionate, 1,6-hexanediol-bis-[3-(3,5-di-t-butyl-4-hydroxyphenyl)-propionate], 1,4-butanediol-bis-[3-(3,5-di-t-butyl-4-hyroxylphenyl)proionate], triethylene glycol-bis-[3-(3-t-butyl-5-methyl-4-hydroxylphenyl) -propionatel], tetrakis-[methylene-3(3'-5'-di-t-butyl-4 '-hydroxylphenyl)-propionate]-methane, 3,9-bis-[2-{3-t-butyl-4-hydroxy-5-methylphenyl)-propionyloxy}-1,1-dimethylethyl]-2,4,8,10-tetraoxaspiro(5,5) undecane, N,N'-bis-3-(3',5'-di-t-butyl-4'-hydroxylphenyl)-propionyl-hexamethylenediamine, N,N'-tetramethylene-bis-3-(3'-methyl-5'-t-butyl-4'-hydroxylphenol)-propionyldiamine, N,N'-bis-[3-(3,5-di-t-butyl-4-hydroxyphenol)-propionyl]-hydrazine, N-salicyloyl-N'-salicylidenehydrazine, 3-(N-salicyloyl)-amino-1,2,4-triazole, N,N'-bis-[2-{3-(3,5-di-t-butyl-4-hydroxylphenyl)-propionyloxy}ethyl]-oxyamide, etc. They can be used alone or in combination of at least two thereof, or together with other additives. They can be used or in combination of at least two thereof, or together with other additives.

The ultraviolet absorbing agent includes, for example, benzotriazole-based ultraviolet absorbing agents such as 2-(2'-hydroxy-5'-methylphenyl)-benzotriazole, 2-(2'-hydroxy-3',5'-di-t-butylphenyl)-benzotriazole, 2-(2'-hydroxy-3',5'-di-isoamylphenyl)-benzotriazole, 2-[2'-hydroxy-3',5'-bis-(α,α-dimethylbenzyl)-phenyl]-2H-benzotriazole, 2-(2'-hydroxy-4'-octoxyphenyl)-benzotriazole, etc., and oxalic anilide-based ultraviolet absorbing agents such as 2-ethoxy-2'-ethyloxalic acid bisanilide, 2-ethoxy-5-t-butyl-2'-ethyloxalic acid bisanilide, 2-ethoxy-3'-dodecyloxalic acid bisanilide, etc. These ultraviolet absorbing agents can be used alone or in combination of at least two thereof or together with other additives.

The photo stabilizer includes, for example, bis-(1,2,2,6, 6-pentamethyl-4-piperidyl)-sebacate, 4-acetoxy-2,2,6,6-tetramethyl-piperidine, 4-stearoyloxy-2,2,6,6-tetramethylpiperidine, 4-acroyloxy-2,2,6,6-tetramethylpiperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-benzyloxy-2,2,6,6-tetramethylpiperidine, 4-phenoxy-2,2,6,6-tetramethylpiperidine, 4-ethylcarbamoyloxy-2,2,6,6-tetramethylpiperdine, 4-cyclohexylcarbamoyloxy-2,2,6,6-tetramethylpiperidine, 4-phenylcarbamoyloxy-2,2,6,6-tetramethylpiperidine, bis(2,2,6,6-tetramethyl-4-piperidyl)-carbonate, bis-(2,2,6,6-tetramethyl-4-piperidyl)-oxalate, bis-(2,2,6,6-tetramethyl-4-piperidyl)-malonate, bis-(2,2,6,6-tetramethyl-4-piperidyl)-sebacate, bis-(2,2,6,6-tetramethyl-4-piperidyl)-terephthalate, 1,2-bis-(2,2,6,6-tetramethyl-4-piperidyloxy)-ethane, α,α'-bis-(2,2,6,6-tetramethyl-4-piperidyloxy)-p-xylene, bis-(2,2,6,6-tetramethyl-4-piperidyltolylene)-2,4-dicarbamate, bis-(2,2, 6,6-tetramethyl-4-piperidyl)-hexamethylene-1,6-dicarbamate, tris-(2,2,6,6-tetramethyl-4-piperidyl)-benzene-1,3,5-tricarboxylate, tris-(2,2,6,6-tetramethyl-4-piperidyl)-benzene-1,3,4-tricarboxylate, 1-[2-{3-(3,5-di-t-butyl-4-hydroxyphenyl)-propionyloxy}-butyl]-4-[3-{3,5-di-t-butyl-4-hydroxyphenyl}-propionyloxy]-2,2,6,6-tetramethylpiperidine, condensate of 1,2,3,4-butanetetracarboxylic acid, 1,2,2,6,6-pentamethyl-4-piperidinol and β,β,β',β'-tetramethyl-3,9-[2,4,8,10-tetraoxaspiro-(5,5)-undecane]-diethanol, bis-(1,2,2,6,6-pentamethyl-4-piperidyl), 2-(3,5-di-t-butyl-4-hydroxybenzyl)-2-n-butylmalonate, bis-(1-octyloxy-2,2,6, 6-tetramethyl-4-piperidyl)-sebacate, poly-[{6-(1,1,3,3-tetramethylbutyl)-amino-1,3,5-triazin-2,4-diyl}{(2,2,6,6-tetramethyl-4-piperidyl)-imino}-hexamethylene-{(2,2,6,6-tetramethyl-4-piperidyl)-imino}], condensate of N,N'-bis-(3-aminopropyl)-ethylenediamine-2,4-bis-[N-butyl-N-(1,2, 2,6,6-pentamethyl-4-piperidyl)-amino]-6-chloro-1,3,5-triazine, polycondensate of dimethyl succinato-1-(2-hydroxylethyl)-4-hydroxy-2,2,6,6-tetramethylpiperidine, etc. They can be used alone or in combination of at least two thereof or together with other additives.

The mold-releasing agent includes, for example, metal salts of fatty acids comprising fatty acids and metal components selected from alkali metals and alkaline earth metals, such as potassium caprate, potassium laurate, potassium tridecylate, potassium myristate, potassium pentadecylate, potassium palmitate, potassium heptadecylate, potassium stearate, potassium nonadecanoate, potassium arachate, potassium behenate, potassium lignocerate, potassium cerotate, potassium montanate, potassium melissate, potassium ceroplastate, potassium undecylenate, potassium oleate, potassium elaidate, potassium cetolate, potassium erucate, potassium brassidate, potassium sorbitate, potassium linolate, potassium propionate, potassium stearolate, potassium 3-hydroxydecanoate, sodium stearate, beryllium distearate, calcium distearate, magnesium distearate, barium distearate, zinc distearate, aluminum distearate, calcium monostearate monopalmitate, calcium monostearate monoheptadecylate, calcium monopalmitate monoheptadecylate, etc., and monohydric and polyhydric alcohols mentioned above as starting materials for the aforementioned dicarboxylic acid esters, or the like. They can be used alone or in combination of at least two thereof or together with other additives.

The filler includes, for example, glass fibers, glass beads, glass balloons, wollastonite, carbon fibers, talc, mica, potassium titanate whiskers, clay, diatomaceous earth, polytetrafluoroethylene fibers, metal fibers, metal powders, calcium carbonate, etc. Their surfaces may be treated with urethane, etc. They can be used alone or in combination of at least two thereof or together with other additives.

The pigment includes, for example, inorganic pigments such as rutile-type or anatase-type titanium oxide, iron oxide, carbon black, ultramarine, Titan Yellow, etc., and organic pigments such as azo pigments, phthalocyanin pigments, anthraquinone pigments, perylene pigments, perinone pigments, quinacridone pigments, isoindoline pigments, thioindigo pigments, dioxazine pigments, isoviolanthrone pigments, indanthrone pigments, etc. They can be used alone or in combination of at least two thereof or together with other additives.

The lubricant includes, for example, silicone compounds such as dimethylpolysiloxane, diphenylpolysiloxane, methylphenylpolysiloxane, etc., those parts of which are modified by alkylene glycols, hydroxyl groups or the like, graft copolymers or block copolymers comprising silicone compounds and other compounds, polyolefinic compounds such as polyethylene, polypropylene, polybutene, copolymer of ethylene-propylene, etc., graft copolyrners or block copolymers comprising olefinic compounds and other compounds, polytetrafluoroethylene particles, carbon disulfide, etc. They can be used alone or in combination of at least two thereof or together with other additives.

Other compounds of common use as additives to the polyoxymethylene resin include, for example, various thermoplastic elastomers such as urethane-based thermoplastic elastomers, etc., multilayer interpolymers, fungicides, bactericides, flame retardants, etc.

A process for producing the present composition is not particularly limited. Generally, the present composition can be obtained by melt kneading polyoxymethylene resin as Component (A), at least one polymer selected from the group consisting of homopolymers of N-vinylcarboxylic acid amides and copolymers of N-vinylcarboxylic acid amides and other vinyl monomers as Component (B) and at least one compound selected from the group consisting of polyalkylene glycol and its derivatives, fatty acid amides, esters of alcohols and fatty acids and esters of alcohols and dicarboxylic acids as Component (C), and, if required, the aforementioned additives by an extruder. The extruder can be uniaxial or biaxial. The extruder temperature is not particularly limited and usually can be selected from a range of 170° C. to 240° C., as desired.

In the present invention, it is very preferable to use a premixture of Component (B) with Component (C) in the production of polyoxymethylene resin compositions. The premixing procedure is not particularly limited and can be appropriately selected from the well known procedures.

The process for molding the present composition is also not particularly limited and molding can be carried out by any of the well known molding processes such as injection molding, extrusion molding, compression molding, vacuum molding, blow molding, expansion molding, insert molding, outsert molding, hollow molding, etc. Even a cutting process may be further used.

The present composition can be generally used in every field of moldings formed from polyoxymethylene resins, including, for example, for electrical and electronic compounds such as gears, rollers, key boards, etc., automobile components such as door handles, shift knobs, etc., writing materials such as pen holders, etc., building equipment components such as sashes, etc., dress accessories such as fasteners, buttons, etc., water service components such as drain trench-, shower-related components, etc., sporting goods components such as ski board bindings, etc. or the like. It is particularly suitable for exterior components such as outer door handles, etc., water service components and sporting goods components.

EXAMPLES

The present invention will be described below, referring to Synthesis Examples, Measuring Procedures, Examples and Comparative Examples.

(1) Polymerization of Polyoxymethylene Homopolymer (A-1)

Thoroughly dehydrated, dried paraformaldehyde was thermally decomposed at 150° C., and passed several times through a cooling trap, thereby obtaining a formaldehyde gas of 99.9% purity. The formaldehyde gas and toluene containing tetrabutylammonium acetate and acetic anhydride were fed continuously for 3 hours at the same time to a stirred polymerization vessel of 5-l capacity with a jacket through which to pass a heating medium, thereby producing polymer. Polymerization temperature was kept at 60° C. Formaldehyde feed rate was set to 110 parts by weight per hour, whereas the feed rate of toluene containing tetrabutylammonium acetate and acetic anhydride was set to 500 parts by weight per hour ("parts by weight" will be hereinafter referred to merely as "parts"). Concentration of tetrabutylammonium acetate in toluene was set to $1.0 \times 10^{-4}$ mol/l, whereas that of acetic anhydride was set to $5.0 \times 10^{-3}$ mol/l.

Polymer-containing toluene was continuously withdrawn from the polymerization vessel at a rate corresponding to the feed rates, and the polymer was separated from toluene by filtration. The polymer was thoroughly washed with acetone and vacuum dried at 60° C., whereby 290 parts of white polymer was obtained. To stabilize the unstable terminal, 50 parts of the white polymer was heated at 139° C. for 3 hours together with 500 parts of acetic anhydride and 0.1 part of sodium acetate and then cooled, followed by filtration, washing and drying under the same conditions as mentioned above, thereby obtaining polyoxymethylene homopolymer resin (A-1). A necessary amount of the resin (A-1) for other Examples, etc. was produced by repeating the same operations as mentioned above, and the total amounts thereof were uniformly mixed.

(2) Polymerization of Polyoxymethylene Block Copolymer Resin (A-2)

Polymer was produced under the same polymerization conditions as in the above polymerization process (1), except that acetic anhydride to be used during the polymerization in the process for producing polyoxymethylene homopolymer resin (A-1) was changed to $C_{18}H_{37}O(CH_2CH_2O)_{70}H$ (ethylene oxide adduct to stearyl alcohol) containing 1,000 ppm 2,6-t-butyl-p-cresol, and one terminal hydroxyl group of the resulting polymer was stabilized by acetic anhydride in the same manner as in the above (1), thereby obtaining polyoxymethylene block copolymer resin (A-2) terminated by an alkylene oxide adduct residue to alcohol and/or carboxylic acid at least at one end.

(3) Polymerization of Polyoxymethylene Copolymer Resin (A-3)

A kneader of 5-l capacity with two stirring blades and a jacket through which to pass a heating medium was adjusted to 80° C. 3 kg of trioxane containing 15 ppm water, 1,3-dioxolane containing 100 ppm tetrakis[methylene-3-(3',5'-di-t-butyl-4-hydroxylphenyl)propionate]methane and methylal as a molecular weight-adjusting agent were added thereto, and mixed. An amount of 1,3-dioxolane containing 100 ppm tetrakis[methylene-3-(3',5'-di-t-butyl-4-hydroxylphenyl)propionate]methane was set to $4.0 \times 10^{-2}$ mole and an amount of methylal was set to $0.7 \times 10^{-3}$ mole on the basis of one mole of trioxane. The mixture was admixed with $0.15 \times 10^{-4}$ mole of dibutyl trifluoroboron ether as a polymerization catalyst on the basis of one mole of trioxane to conduct polymerization.

30 minutes after the start of reaction, the jacket temperature was changed to 30° C., and 2 l of an aqueous 1 wt. % triethylamine solution was added thereto and the catalyst was deactivated with stirring over one hour to discontinue the reaction. Then, the contents of the kneader were taken out and filtered, and the filter cake was dried at 100° C., whereby 2.7 kg of polyoxymethylene copolymer resin was obtained.

The resulting polyoxymethylene copolymer resin was fed to a 30-mm biaxial extruder (L/D ratio=32) with one vent opening. Extruder temperature was set to 200° C., and amounts of water added to the extruder reaction zone and triethylamine used as a basic compound were set to 0.2 wt. % and 0.1 wt. %, respectively, on the basis of the polyoxymethylene copolymer resin. Terminal stabilization of polyoxymethylene copolymer resin and removal of volatile matters therefrom were carried out under a vent vacuum degree of 700 mmHg, whereby polyoxymethylene copolymer resin (A-3) in the pellet form was obtained.

(4) Production of N-vinylcarboxylic Acid Amide Homopolymer (B-1)

In a separable flask of 2-l capacity with a stirring rod, an aqueous solution containing 100 parts of N-vinylacetamide in 280 parts of water, heated to 30° C., was admixed with 20 parts of an aqueous 5 wt. % 2,2'-azobis-2-amidinopropane dihydrochloride solution as a polymerization initiator, and subjected to polymerization at a temperature of 30° C. for 10 hours. 100 parts of acetone was added to the solution containing the polymer, followed by stirring for 30 minutes and vacuum drying at 80° C. The resulting polymer was cooled with liquid nitrogen for 10 minutes and then crushed by an atomizer (Type-S, made by Tokyo Atomizer Manufacturing Co.) and further pulverized by an ultrafine pulverizer (SH-75, made by Ishikawajima-Harima Heavy Industries Co., Ltd.) to obtain N-vinylcarboxylic acid amide homopolymer having an average particle size of 10 μm (B-1).

(5) Production of N-vinylcarboxylic Acid Amide Homopolymers (B-2) to (B-4)

Three kinds of N-vinylcarboxylic acid homopolymers (B-2) to (B-4) were produced in the same manner as in the aforementioned (4), except that the following monomers were used in place of N-vinylacetamide. (B-2) had an average particle size of 11 μm, (B-3) had an average particle size of 11 μm and (B-4) had an average particle size of 10 μm.

For (B-2), N-vinylformamide
For (B-3), N-methyl-N-vinylacetamide
For (B-4), N-methyl-N-vinylformamide

(6) Production of Copolymer (B-5) of N-vinylcarboxylic Acid Amide and Other Vinyl Monomer In a separable flask of 2-l capacity with a stirring rod, a solution obtained by adding 100 parts of N-vinylacetamide and $1 \times 10^{-12}$ mole of N,N'-methylenebisacrylamide on the basis of one mole of N-vinylacetamide to 200 parts of ethyl acetate, heated to 75° C., was admixed with 0.2 parts of azobisisobutyronitrile and subjected to polymerization at a temperature of 75° C. for 8 hours. The polymer was recovered by filtration and then vacuum dried at 80° C., followed by grinding and pulverization in the same manner as in the above-mentioned (4) to obtain copolymer (B-5) of N-vinylcarboxylic acid amide and other vinyl monomer having an average particle size of 5 μm.

(7) Production of Copolymers (B-6) to (B-11) of N-vinylcarboxylic Acid Amide and Other Vinyl Monomers Copolymers (B-6) to (B-11) of N-vinylcarboxylic acid amide and other vinyl monomers were produced in the same manner as in the above-mentioned (6) except that the following monomers were used in place of N,N'-methylenebisacrylamide: (B-6) had an average particle size of 11 μm, (B-7) had an average particle size of 11 μm, (B-8) had an average particle size of 5 μm, (B-9) had an average particle size of 6 μm, (B-10) had an average particle size of 4 μm and (B-11) had an average particle size of 5 μm.

For B-6, acrylic acid
For B-7, vinyl acetate
For B-8, N,N'-butylenebis(N-vinylacetamide)
For B-9, divinylbenzene
For B-10, trimethylolpropanetriacrylate
For B-11, pentaerythritol diacrylate

(8) Polyalkylene Glycols and Their Derivatives (C-1) to (C-9)

C-1: polyethylene glycol (number average molecular weight=400)
C-2: polyethylene glycol (number average molecular weight=1,000)
C-3: polyethylene glycol (number average molecular weight=6,000)
C-4: polypropylene glycol (number average molecular weight=4,000)
C-5: block copolymer of ethylene glycol/propylene glycol=50/50 (number average molecular weight=6,000)
C-6: polyethylene glycol monostearyl ether (number average molecular weight=4,000)
C-7: polyethylene glycol monostearate ester (number average molecular weight=4,000)
C-8: polyethylene glycol distearate ester (number average molecular weight=4,000)
C-9: polytetramethylene glycol (number average molecular weight=500)

(9) Fatty Acid Amides (C-10) to (C-17)

C-10: ethylene-bis-stearamide
C-11: ethylene-bis-behenamide
C-12: ethylene-bis-stearolamide
C-13: ethylene-bis-acetamide
C-14: ethylene-bis-erucamide
C-15: phenylene-bis-stearamide
C-16: fatty acid amide mixture of ethylene-bis-stearamide, ethylene-bis-palmitamide and ethylene (monostearamide and monopalmitamide)amide, obtained from stearic acid, palmitic acid and ethylenediamine
C-17: fatty acid amide mixture obtained from stearic acid, heptadecylic acid, palmitic acid and ethylenediamine

(10) Esters of Alcohols and Fatty Acids and Esters of Alcohols and Dicarboxylic Acids (C-18) to (C-28)

C-18: cetyl myristate ester
C-19: stearyl stearate ester
C-20: ethylene-bis-stearate ester
C-21: dilauryl adipate ester
C-22: 1,4-butanediol dilaurate ester
C-23: glycerin monostearate ester
C-24: fatty acid ester mixture of ethylene-bis-stearate ester, ethylene-bis-palmitate ester, ethylene(monostearate-monopalmitate)-ester, ethylene glycol monostearate ester, and ethylene glycol monopalmitate ester, obtained from stearic acid, palmitic acid and ethylene glycol C-25: fatty acid ester mixture obtained from stearic acid, heptadecylic acid, palmitic acid and glycerin C-26: dicarboxylic acid ester mixture of distearyl adipate ester, dicetyl adipate ester, (monostearyl-monocetyl) adipate ester, monostearyl adipate ester and monocetyl adipate ester, obtained from stearyl alcohol, cetyl alcohol and adipic acid C-27: dicarboxylic acid ester mixture, obtained from stearyl alcohol, heptadecyl alcohol, cetyl alcohl and adipic acid C-28: fatty acid ester mixture obtained from palmitic acid, stearic acid and stearyl alcohol

(11) Other Compounds

D-1: LDPE (Mn: 15,000)

D-2: dimethylpolysiloxane (10,000 mm$^2$/S)

D-3: pentaerythritol

(12) Production of Polyoxymethylene Resin Composition

Polyoxymethylene resins of (A-1) to (A-3), N-vinylcarboxylic acid amide homopolymers and copolymers of N-vinylcarboxylic acid amides and other vinyl monomers of (B-1) to (B-11), polyalkylene glycols and their derivatives, fatty acid amides, esters of alcohols and fatty acids or dicarboxylic acids of (C-1) to (C-28), and other compounds were mixed in the mixing ratios given in Tables 1 to 7, and further admixed with 0.3 parts of triethyleneglycol-bis-[3-(3-t-butyl-5-methyl-4-hydroxyphenyl)-propionate] as an antioxidant. The resulting mixtures were melt kneaded by a 30-mm (inner diameter) vented biaxial extruder (L/D ratio=32) at an extrusion temperature:200° C., a discharge rate: 5 kg/hr, screw revolution:100 rpm and vent vacuum degree:700 mmHg, and pelletized to obtain polyoxymethylene resin compositions of Examples 1 to 64 and Comparative Examples 1 to 14.

(13) Evaluation of "Scorching" Generation Rate 0.5 mm-thick films were prepared from the resulting polyoxymethylene resin compositions by a compression molding machine, and the number of "scorchings" having sizes of 0.1 mm or more (number of scorchings/100 g) was counted by a magnifying glass under irradiation of a backlight so as to observe even the inside of the film.

(14) Evaluation of Formaldehyde Gas Release Rate (Which Will Be Hereinafter Referred to as "Formgas Release Rate")

3 g of polyoxymethylene resin composition was placed in an aluminum vessel and melted by heating at 230° C. for 90 minutes in an air stream (6 l/min.). The released formaldehyde gas was absorbed into an aqueous 1 mol/l sodium sulfite solution. The absorbed solution was titrated by 0.01N sulfuric acid to determine a formgas release rate in terms of ppm by weight on the basis of the polyoxymethylene resin composition.

(15) Process for Molding Test Pieces for Water Resistance Evaluation and Evaluation of Water Resistance ASTM dumbbell test pieces were molded from the polyoxymethylene resin composition by a molding machine having a 5-ounce injection capacity (Nestahi injection molding machine, made by Sumitomo Heavy Industries, Ltd.) under such conditions as cylinder temperature: 200° C., injection pressure: 6 MPa gage, injection rate: 50%, injection time: 30 seconds, cooling time: 30 seconds, and mold temperature: 80° C.

The molded test pieces were dipped in hot water at 99° C., taken out therefrom at every one week, left standing in a thermostat chamber kept at 23° C. and a humidity of 50% for one week and then subjected to a tensile test by a tensile testing machine (AG-1000B, made by Shimadzu Corp.) at a pulling rate: 5 mm/min. and an interchuck distance: 114 mm. The time taken until the strength tenacity failed to maintain 80% of that of the indipped molded test pieces was measured. In Table 6, the resin compositions referred to as "failed to mold" mean that they failed to be plasticized within the cooling time due to sliding occurrences in the injection molding machine.

(16) Process for Molding Test Pieces for Evaluation of Repeated Impact Resistance Test pieces (size: 13 mm×180 mm×3 mm) were molded from the polyoxymethylene resin compositions by a molding machine having a 5-ounce injection capacity (Nestahl injection molding machine, made by Sumitomo Heavy Industries, Ltd.) under such conditions as cylinder temperature: 200° C., injection pressure: 6 MPa gage, injection rate: 50%, injection time: 30 seconds, cooling time: 30 seconds, and mold temperature: 80° C., and cut into notched test pieces for an Izod test according to ASTM-D256.

The molded test pieces were subjected to measurement of number of impacts given until the test pieces were ruptured by a repeated impact testing machine (No. 598, made by Toyo Seiki Manufacturing Co.) under such conditions as falling load: 320 g, falling height: 10.5 mm, and falling frequency; one run/second. The polyoxymethylene resin compositions, which were not ruptured at 5,000 impacts, are referred to as "(>5,000)".

Table 1 shows the results of Examples 1 to 11 and Comparative Examples 1 to 3.

Reduction in the amount of released "formgas", suppression of "scorching" generation and simultaneous improvement of water resistance and repeated impact resistance were confirmed by using a specific ternary system of (A), (B) and (C) as in the present polyoxymethylene resin compositions.

In the case that Component (B) was N-vinylcarboxylic acid amide homopolymer, that is, poly(N-vinylcarboxylic acid amide), further reduction in the amount of released "formgas" was confirmed by using poly(N-vinylcarboxylic acid amide) made from N-vinylacetamide (B-1: Example 1). In the case of copolymers of N-vinylcarboxylic acid amides and other vinyl monomers, it was confirmed that a better result was obtained on further improvement of water resistance by using other vinyl monomers having at least two functional groups capable of forming a crosslinked structure, because of distinguished pulverizability (further reduction in average particle size by one and the same operation).

TABLE 1

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 1 | A-1 100 | B-1 0.5 | C-3 0.5 | | 0 | 100 | 1344 | >5,000 |
| Ex. 2 | A-1 100 | B-2 0.5 | C-3 0.5 | | 0 | 230 | 1008 | >5,000 |
| Ex. 3 | A-1 100 | B-3 0.5 | C-3 0.5 | | 0 | 200 | 1008 | >5,000 |
| Ex. 4 | A-1 100 | B-4 0.5 | C-3 0.5 | | 0 | 370 | 840 | >5,000 |
| Ex. 5 | A-1 100 | B-5 0.5 | C-3 0.5 | | 0 | 80 | 1848 | >5,000 |
| Ex. 6 | A-1 100 | B-6 0.5 | C-3 0.5 | | 0 | 350 | 1176 | >5,000 |
| Ex. 7 | A-1 100 | B-7 0.5 | C-3 0.5 | | 0 | 320 | 1176 | >5,000 |
| Ex. 8 | A-1 100 | B-8 0.5 | C-3 0.5 | | 0 | 70 | 1848 | >5,000 |
| Ex. 9 | A-1 100 | B-9 0.5 | C-3 0.5 | | 0 | 100 | 1680 | >5,000 |
| Ex. 10 | A-1 100 | B-10 0.5 | C-3 0.5 | | 0 | 80 | 1680 | >5,000 |
| Ex. 11 | A-1 100 | B-11 0.5 | C-3 0.5 | | 0 | 80 | 1680 | >5,000 |
| Comp. Ex. 1 | A-1 100 | B-1 0.5 | | | 45 | 520 | 168 | 2,500 |
| Comp. Ex. 2 | A-1 100 | | C-3 0.5 | | 0 | >100,000 | 168 | 1,300 |
| Comp. Ex. 3 | A-1 100 | | | Nylon 66 0.5 | 5 | 1050 | 2016 | >5,000 |

Table 2 shows the results of Examples 12 to 21 and Comparative Examples 4 to 5.

In Comparative Examples 4 and 5 showing that the amount of Component (B) is outside of the range of 0.01 to 5 parts by weight, it was found that "formgas" was released in a large amount and that the water resistance and the repeated impact resistance were poor.

As Component (C), namely polyalkylene glycol and its derivatives, it was further confirmed that polyethylene glycol, polypropylene glycol and copolymers of ethylene glycol-propylene glycol having a number average molecular weight of 4,000 or more were distinguished in the water resistance.

TABLE 2

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 12 | A-1 100 | B-1 0.01 | C-3 0.5 | | 0 | 300 | 840 | >5,000 |
| Ex. 13 | A-1 100 | B-1 5 | C-3 0.5 | | 0 | 50 | 1344 | >5,000 |
| Comp. Ex. 4 | A-1 100 | B-1 0.001 | C-3 0.5 | | 0 | 990 | 336 | 3,800 |
| Comp. Ex. 5 | A-1 100 | B-1 10 | C-3 0.5 | | 4 | 370 | 168 | 250 |
| Ex. 14 | A-1 100 | B-1 0.5 | C-1 0.5 | | 0 | 160 | 840 | >5,000 |
| Ex. 15 | A-1 100 | B-1 0.5 | C-2 0.5 | | 0 | 150 | 1008 | >5,000 |
| Ex. 16 | A-1 100 | B-1 0.5 | C-4 0.5 | | 0 | 80 | 1344 | >5,000 |
| Ex. 17 | A-1 100 | B-1 0.5 | C-5 0.5 | | 0 | 70 | 1512 | >5,000 |
| Ex. 18 | A-1 100 | B-1 0.5 | C-6 0.5 | | 0 | 80 | 1008 | >5,000 |
| Ex. 19 | A-1 100 | B-1 0.5 | C-7 0.5 | | 0 | 80 | 1008 | >5,000 |

TABLE 2-continued

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 20 | A-1 100 | B-1 0.5 | C-8 0.5 |  | 0 | 80 | 1176 | >5,000 |
| Ex. 21 | A-1 100 | B-1 0.5 | C-9 0.5 |  | 0 | 240 | 840 | >5,000 |

Table 3 shows the results of Examples 22 to 29. As fatty acid amides, it was confirmed that particularly saturated fatty acid amides, obtained from at least two saturated fatty acids having 12 to 22 carbon atoms and at least one diamine, were distinguished in the water resistance.

TABLE 3

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 22 | A-1 100 | B-1 0.5 | C-10 0.5 |  | 0 | 200 | 1176 | >5,000 |
| Ex. 23 | A-1 100 | B-1 0.5 | C-11 0.5 |  | 0 | 190 | 1176 | >5,000 |
| Ex. 24 | A-1 100 | B-1 0.5 | C-12 0.5 |  | 0 | 270 | 840 | >5,000 |
| Ex. 25 | A-1 100 | B-1 0.5 | C-13 0.5 |  | 0 | 380 | 1008 | >5,000 |
| Ex. 26 | A-1 100 | B-1 0.5 | C-14 0.5 |  | 0 | 360 | 840 | >5,000 |
| Ex. 27 | A-1 100 | B-1 0.5 | C-15 0.5 |  | 0 | 230 | 1008 | >5,000 |
| Ex. 28 | A-1 100 | B-1 0.5 | C-16 0.5 |  | 0 | 110 | 1680 | >5,000 |
| Ex. 29 | A-1 100 | B-1 0.5 | C-17 0.5 |  | 0 | 90 | 2016 | >5,000 |

Table 4 shows the results of Examples 30 to 40. As esters of alcohols and fatty acids and esters of alcohols and dicarboxylic acids, it was confirmed that particularly a mixture of saturated fatty acid esters, obtained from at least two saturated fatty acids having 12 to 22 carbon atoms and at least one monohydric alcohol (Example 40), mixtures of saturated fatty acid esters, obtained from at least two saturated fatty acids having 12 to 22 carbon atoms and at least one polyhydric alcohol having 2 to 6 hydroxyl groups (Examples 36 and 37), and mixtures of dicarboxylic acid esters, obtained from at least two saturated aliphatic alcohols having 12 to 22 carbon atoms and at least one dicarboxylic acid (Examples 38 and 39) were distinguished in the water resistance.

In Examples 14 to 40, which compounds were most suitable for Component (C) was determined from the amounts of released "formgas" of polyoxymethylene resin compositions comprising 100 parts of (A-1), 0.5 parts of (B-1) and 0.5 parts of Component C. For polyalkylene glycols and their derivatives the amount of released "formgas" was 70 ppm (Example 17); for the fatty acid amide it was 90 ppm (Example 29); and for the esters of alcohols and fatty acids or dicarboxylic acids it was 130 ppm (Example 37). It was confirmed that polyalkylene glycols and their derivatives were most suitable for Component (C).

TABLE 4

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 30 | A-1 100 | B-1 0.5 | C-18 0.5 |  | 0 | 270 | 1344 | >5,000 |
| Ex. 31 | A-1 100 | B-1 0.5 | C-19 0.5 |  | 0 | 230 | 1176 | >5,000 |
| Ex. 32 | A-1 100 | B-1 0.5 | C-20 0.5 |  | 0 | 260 | 1344 | >5,000 |

TABLE 4-continued

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 33 | A-1 100 | B-1 0.5 | C-21 0.5 |  | 0 | 280 | 1344 | >5,000 |
| Ex. 34 | A-1 100 | B-1 0.5 | C-22 0.5 |  | 0 | 220 | 1344 | >5,000 |
| Ex. 35 | A-1 100 | B-1 0.5 | C-23 0.5 |  | 0 | 290 | 1176 | >5,000 |
| Ex. 36 | A-1 100 | B-1 0.5 | C-24 0.5 |  | 0 | 200 | 1680 | >5,000 |
| Ex. 37 | A-1 100 | B-1 0.5 | C-25 0.5 |  | 0 | 130 | 2016 | >5,000 |
| Ex. 38 | A-1 100 | B-1 0.5 | C-26 0.5 |  | 0 | 200 | 1680 | >5,000 |
| Ex. 39 | A-1 100 | B-1 0.5 | C-27 0.5 |  | 0 | 170 | 1848 | >5,000 |
| Ex. 40 | A-1 100 | B-1 0.5 | C-28 0.5 |  | 0 | 200 | 1680 | >5,000 |

Table 5 shows the results of Examples 41 to 49. It was confirmed that Examples 41 to 46 showing uses of two kinds of Component (C) (uses of the same species and different species) had an equivalent or somewhat superior effect on the improvement of water resistance to those of single uses (Examples 5 and 10).

Furthermore, as to uses of two kinds of Component (B), it was confirmed that Examples 47 to 49 showing uses of two kinds of Component (B) had an equivalent or somewhat superior effect on the improvement of water resistance to those of Examples 2, 3, 4, 6, 9 and 10 showing single uses.

Table 6 shows the results of Examples 50 to 55 and Comparative Examples 6 to 11. It was found that, when the amount of Component (C) as added was outside the range of 0.01 to 5 parts by weight, "formgas" was released in a large amount and there were such problems as poor effect on suppression of "scorching" generation, poor water resistance and repeated impact resistance and difficult molding of the compositions per se.

TABLE 5

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 41 | A-1 100 | B-5 5.5 | C-3:0.25 C-4:0.25 |  | 0 | 50 | 1848 | >5,000 |
| Ex. 42 | A-1 100 | B-5 0.5 | C-3:0.25 C-17:0.25 |  | 0 | 80 | 2016 | >5,000 |
| Ex. 43 | A-1 100 | B-5 0.5 | C-3:0.25 C-25:0.25 |  | 0 | 60 | 2016 | >5,000 |
| Ex. 44 | A-1 100 | B-5 0.5 | C-11:0.25 C-17:0.25 |  | 0 | 70 | 1848 | >5,000 |
| Ex. 45 | A-1 100 | B-5 0.5 | C-17:0.25 C-25:0.25 |  | 0 | 70 | 2016 | >5,000 |
| Ex. 46 | A-1 100 | B-10 0.5 | C-25:0.25 C-27:0.25 |  | 0 | 80 | 2184 | >5,000 |
| Ex. 47 | A-1 100 | B-2:0.25 B-3:0.25 | C-3 0.5 |  | 0 | 190 | 1176 | >5,000 |
| Ex. 48 | A-1 100 | B-4:0.25 B-6:0.25 | C-3 0.5 |  | 0 | 300 | 1008 | >5,000 |
| Ex. 49 | A-1 100 | B-9:0.25 B-10:0.25 | C-3 0.5 |  | 0 | 80 | 1680 | >5,000 |

TABLE 6

| | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 50 | A-1 100 | B-1 0.5 | C-3 0.01 | | 0 | 250 | 1008 | >5,000 |
| Ex. 51 | A-1 100 | B-1 0.5 | C-3 5 | | 0 | 170 | 1512 | >5,000 |
| Comp. Ex. 6 | A-1 100 | B-1 0.5 | C-3 0.001 | | 38 | 520 | 168 | 2,700 |
| Comp. Ex. 7 | A-1 100 | B-1 0.5 | C-3 10 | | 0 | 820 | 336 | 1,000 |
| Ex. 52 | A-1 100 | B-5 0.5 | C-10 0.01 | | 0 | 280 | 840 | >5,000 |
| Ex. 53 | A-1 100 | B-5 0.5 | C-10 5 | | 0 | 180 | 1680 | >5,000 |
| Comp. Ex. 8 | A-1 100 | B-1 0.5 | C-10 0.001 | | 42 | 600 | 336 | 2,000 |
| Comp. Ex. 9 | A-1 100 | B-1 0.5 | C-10 10 | | 2 | Pellets discolored to yellow and failed to mold (due to sliding) | | |
| Ex. 54 | A-1 100 | B-1 0.5 | C-20 0.01 | | 0 | 300 | 1008 | >5,000 |
| Ex. 55 | A-1 100 | B-1 0.5 | C-20 5 | | 0 | 150 | 1512 | >5,000 |
| Comp. Ex. 10 | A-1 100 | B-1 0.5 | C-20 0.001 | | 42 | 580 | 168 | 2,300 |
| Comp. Ex. 11 | A-1 100 | B-1 0.5 | C-20 10 | | 0 | Failed to mold (due to sliding) | | |

Table 7 shows the results of Examples 56–64 and Comparative Examples 12–14.

It was confirmed that substantially no effect was obtained on the suppression of "scorching" generation even by addition of Component (D) in place of Component (C) (Comparative Examples 12 to 14).

In Examples 56 to 60 showing premixing of Component (B) with Component (C) in a mortar for 5 minutes, followed by mixing with Component (A), the premixing of Component (B) with Component (C) and setting of a mixing ratio of Component (B) to Component (C) to 0.2 to 4 (=(B)/(C)) were found preferable.

Furthermore, according to the results of Examples 61 to 64, it was confirmed preferable from the viewpoints of amount of released "formgas" and repeated impact resistance to use polyoxymethylene homopolymers or polyoxymethylene block polymers, one end of which was terminated with an alkylene oxide adduct residue to alcohol and/or carboxylic acid as Component (A). It was also confirmed that either use of two kinds or a single use of Component (A) had an equivalent effect.

TABLE 7

| | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Comp. Ex. 12 | A-1 100 | B-1 0.5 | | D-1 0.5 | 46 | 600 | 168 | 2,000 |
| Comp. Ex. 13 | A-1 100 | B-1 0.5 | | D-2 0.5 | 43 | 620 | 336 | >5,000 |
| Comp. Ex. 14 | A-1 100 | B-1 0.5 | | D-3 0.5 | 50 | 630 | 336 | >5,000 |
| Ex. 56 | A-1 100 | B-8 0.5 | C-17 0.05 | | 0 | 240 | 1008 | >5,000 |
| Ex. 57 | A-1 100 | B-8 0.5 | C-17 0.1 | | 0 | 200 | 1680 | >5,000 |
| Ex. 58 | A-1 100 | B-8 0.5 | C-17 2.0 | | 0 | 150 | 1848 | >5,000 |
| Ex. 59 | A-1 100 | B-8 0.5 | C-17 5.0 | | 0 | 220 | 1512 | >5,000 |
| Ex. 60 | A-1 100 | B-8 0.5 | C-17 2.0 | | 0 | 110 | 2184 | >5,000 |
| Ex. 61 | A-1 100 | B-10 1.0 | C-5 0.5 | | 0 | 70 | 2016 | >5,000 |
| Ex. 62 | A-2 100 | B-10 1.0 | C-5 0.5 | | 0 | 80 | 1848 | >5,000 |

TABLE 7-continued

|  | Component A (parts) | Component B (parts) | Component C (parts) | Others (parts) | Scorching (Number of occurrences) | Amount of released "formgas" (ppm) | Water resistance (hours) | Repeated impact resistance (Number of impact) |
|---|---|---|---|---|---|---|---|---|
| Ex. 63 | A-3 100 | B-10 1.0 | C-5 0.5 |  | 0 | 450 | >3,000 | 3,800 |
| Ex. 64 | A-1:50 A-2:50 | B-10 1.0 | C-5 0.5 |  | 0 | 70 | 1848 | >5,000 |

INUDUSTRIAL UTILITY

The present resin composition reduces the amount of released formaldehyde gas during production and molding and improves the water resistance and repeated impact resistance of the resulting moldings at the same time by adding to polyoxymethylene resin at least one member selected from the group consisting of specific N-vinylcarboxylic acid amide homopolymers and copolymers of N-vinylcarboxylic acid amides and other vinyl monomers, and at least one compound selected from the group consisting of specific polyalkylene glycols and their derivatives, fatty acid amides, esters of alcohols and fatty acids and esters of alcohols and dicarboxylic acids. Thus, the present polyoxymethylene resin composition can be used widely as automobile components, electric and electronic components and industrial components such as sash rollers, and is very suitable particularly for uses such as components for use in water or high-humidity atmosphere or components susceptible to repeated stress, or the like.

The invention claimed is:

1. A polyoxymethylene resin composition, which consists essentially of (A) 100 parts by weight of polyoxymethylene resin, (B) 0.01 to 5 parts by weight of at least one polymer selected from the group consisting of homopolymers of N-vinylcarboxylic acid amides and copolymers of N-vinylcarboxylic acid amides and other vinyl monomers, and (C) 0.01 to 5 parts by weight of at least one compound selected from the group consisting of polyalkylene glycol and its derivatives, fatty acid amides, esters of alcohols and fatty acids, and esters of alcohols and dicarboxylic acids, and wherein said resin composition suppresses scorching generation during a production or molding thereof.

2. A polyoxymethylene resin composition according to claim 1, wherein the N-vinylcarboxylic acid amide is N-vinylacetamide.

3. A polyoxymethylene resin composition according to claim 1, wherein the copolymers of N-vinylcarboxylic acid amides and other vinyl monomers are in a crosslinked structure.

4. A polyoxymethylene resin composition according to claim 1, wherein the polyalkylene glycol and its derivatives are at least one member selected from the group consisting of polyethylene glycol and its derivatives, polypropylene glycol and its derivatives, and copolymers of ethylene glycol-propylene glycol and their derivatives and have a number average molecular weight of 4,000 to 8,000.

5. A polyoxymethylene resin composition according to claim 1, wherein the fatty acid amides are a mixture of saturated fatty acid amides, obtained from at least two saturated fatty acids having 12 to 22 carbon atoms and at least one diamine.

6. A polyoxymethylene resin composition according to claim 1, wherein the esters of alcohols and fatty acids are at least one member selected from the group consisting of a mixture of saturated fatty acid esters, obtained from at least two saturated fatty acids having 12 to 22 carbon atoms and at least one monohydric alcohol and a mixture of saturated fatty acid esters, obtained from at least one polyhydric alcohol having 2 to 6 hydroxyl groups.

7. A polyoxymethylene resin composition according to claim 1, wherein the esters of alcohols and dicarboxylic acids are a mixture of dicarboxylic acid esters, obtained from at least two saturated aliphatic monohydric alcohols having 12 to 22 carbon atoms and at least one dicarboxylic acid.

8. A polyoxymethylene resin composition according to any one of claims 1 to 7, wherein the polyoxymethylene resin is a polyoxymethylene homopolymer or a polyoxymethylene block copolymer, one end of which is terminated by an alkylene oxide adduct residue to alcohol and/or carboxylic acid.

9. A polyoxymethylene resin composition according to claim 1, wherein the composition has no scorching with a size of 0.1 mm or larger, when molded into a 0.5 mm-thick film.

* * * * *